United States Patent
Götzinger et al.

(10) Patent No.: US 12,429,700 B2
(45) Date of Patent: Sep. 30, 2025

(54) ANTENNA STRUCTURE, LIGHT EMITTING DEVICE AND METHOD FOR DESIGNING AN ANTENNA STRUCTURE

(71) Applicants: Max-Planck-Gesellschaft zur Förderung der Wissenschaften e.V., Munich (DE); Huazhong University of Science and Technology, Wuhan (CN)

(72) Inventors: Stephan Götzinger, Erlangen (DE); Luis Esteban Alejandro Morales, Erlangen (DE); Xuewen Chen, Wuhan (CN); Wancong Li, Wuhan (CN)

(73) Assignees: Max-Planck-Gesellschaft zur Föderung der Wissenschaften e.V., Munich (DE); Huazhong University of Science and Technology, Wuhan (DE)

( * ) Notice: Subject to any disclaimer, the term of this patent is extended or adjusted under 35 U.S.C. 154(b) by 444 days.

(21) Appl. No.: 18/161,411

(22) Filed: Jan. 30, 2023

(65) Prior Publication Data
US 2023/0176389 A1   Jun. 8, 2023

Related U.S. Application Data

(63) Continuation of application No. PCT/EP2020/071526, filed on Jul. 30, 2020.

(51) Int. Cl.
*G02B 5/18* (2006.01)
*G02B 27/09* (2006.01)

(52) U.S. Cl.
CPC ....... *G02B 27/0916* (2013.01); *G02B 5/1861* (2013.01); *G02B 27/0927* (2013.01); *G02B 27/0977* (2013.01)

(58) Field of Classification Search
None
See application file for complete search history.

(56) References Cited

U.S. PATENT DOCUMENTS

| 10,514,509 B2 * | 12/2019 | Popovic | G02B 6/34 |
| 2010/0074063 A1 * | 3/2010 | Peng | G11B 5/314 |
| | | | 360/122 |

(Continued)

FOREIGN PATENT DOCUMENTS

WO   2015019229 A1   2/2015

OTHER PUBLICATIONS

International Preliminary Report on Patentability issued in PCT/EP2020/071526, to which this application claims priority, mailed Feb. 9, 2023.

(Continued)

*Primary Examiner* — Wilson Lee
(74) *Attorney, Agent, or Firm* — Tautz & Schuhmacher LLC

(57) ABSTRACT

An antenna structure for directing light is disclosed. The antenna structure includes a reflector having a reflective surface and a ring-shaped dielectric grating arranged at the reflective surface and extending concentrically along a center axis perpendicular to the reflective surface and forming an omnidirectional reflector surrounding a low-index center portion of the ring-shaped dielectric grating. The antenna structure is configured to outcouple light emitted inside the low-index center portion through an upper end of the dielectric grating along the center axis with a Gaussian beam profile projection efficiency η of at least 65%. A light emitting device and a method for designing an antenna structure are also disclosed.

25 Claims, 7 Drawing Sheets

(56) References Cited

U.S. PATENT DOCUMENTS

| | | | | |
|---|---|---|---|---|
| 2013/0208332 | A1* | 8/2013 | Yu | H01Q 15/10 |
| | | | | 977/773 |
| 2014/0193115 | A1* | 7/2014 | Popovic | G02B 6/124 |
| | | | | 385/14 |
| 2015/0346340 | A1* | 12/2015 | Yaacobi | G01S 7/499 |
| | | | | 356/5.11 |
| 2018/0128742 | A1* | 5/2018 | Agio | B82Y 20/00 |
| 2020/0386386 | A1* | 12/2020 | Murai | F21V 9/08 |

OTHER PUBLICATIONS

Fink et al., "A Dielectric Omnidirectional Reflector," Science Magazine, vol. 282, pp. 1679 to 1682, Nov. 27, 1998.

Ibanescu et al., "An All-Dielectric Coaxial Waveguide," Science Magazine, vol. 289, pp. 415 to 419, Jul. 2000.

Bermel et al., "Properties of Radiating Pointlike Sources in Cylindrical Omnidirectionally Reflecting Waveguides," The American Physical Society, Physical Review, B 69, 035316, 2004.

Davanco et al., "A circular dielectric grating for vertical extraction of single quantum dot emission," arxiv.org, Cornell University Library, 201 Olin Library Cornell University Ithaca, NY 14853, Apr. 2, 2011.

Sapienza et al., "Nanoscale Optical Positioning of Single Quantum Dots for Bright and Pure Single-Photon Emission," Nature Communications, vol. 6, No. 1, Dec. 1, 2015.

Yang et al., "Near-to-Far Field Transformations for Radiative and Guided Waves," ACS Photonics 3, pp. 395 to 402, 2016.

Zheng et al., Near-Unity Collection Efficiency From Quantity Emitters in Bulk Diamond using Chirped Circular Dielectric Gratings Arxiv.Org, Cornell University Library, 201 Olin Library Cornell University Ithaca, NY 14853, vol. 25, Issue 26, pp. 32420-32435, Jun. 23, 2017 (Jun. 23, 2017).

Zhang Hewei et al., "Single Mode-Fiber Scale Based Square Solid Immersion Metalens for Single Quantum Emitters," Optical Materials, Elsevier Science Publishers B. V. Amsterdam, NL, vol. 105, (Apr. 24, 2020).

Li et al., "The Truncated Metallo-dielectric Omnidirectional Reflector: Collecting Single Photons in the Fundamental Gaussian Mode with 95% Efficiency," School of Physics, ACS Photonics 2020, 7, 9, pp. 2474-2481, Aug. 4, 2020.

Li et al., The Truncated Metallo-dielectric Omnidirectional Reflector: Collecting Single Photons in the Fundamental Gaussian Mode with 95% Efficiency, Supplementary Material, School of Physics, ACS Photonics 2020, 7, 9, pp. 2474-2481, Aug. 4, 2020.

International Search Report and Written Opinion issued in International Application PCT/EP2020/071526, to which this application claims priority, mailed May 3, 2021.

\* cited by examiner

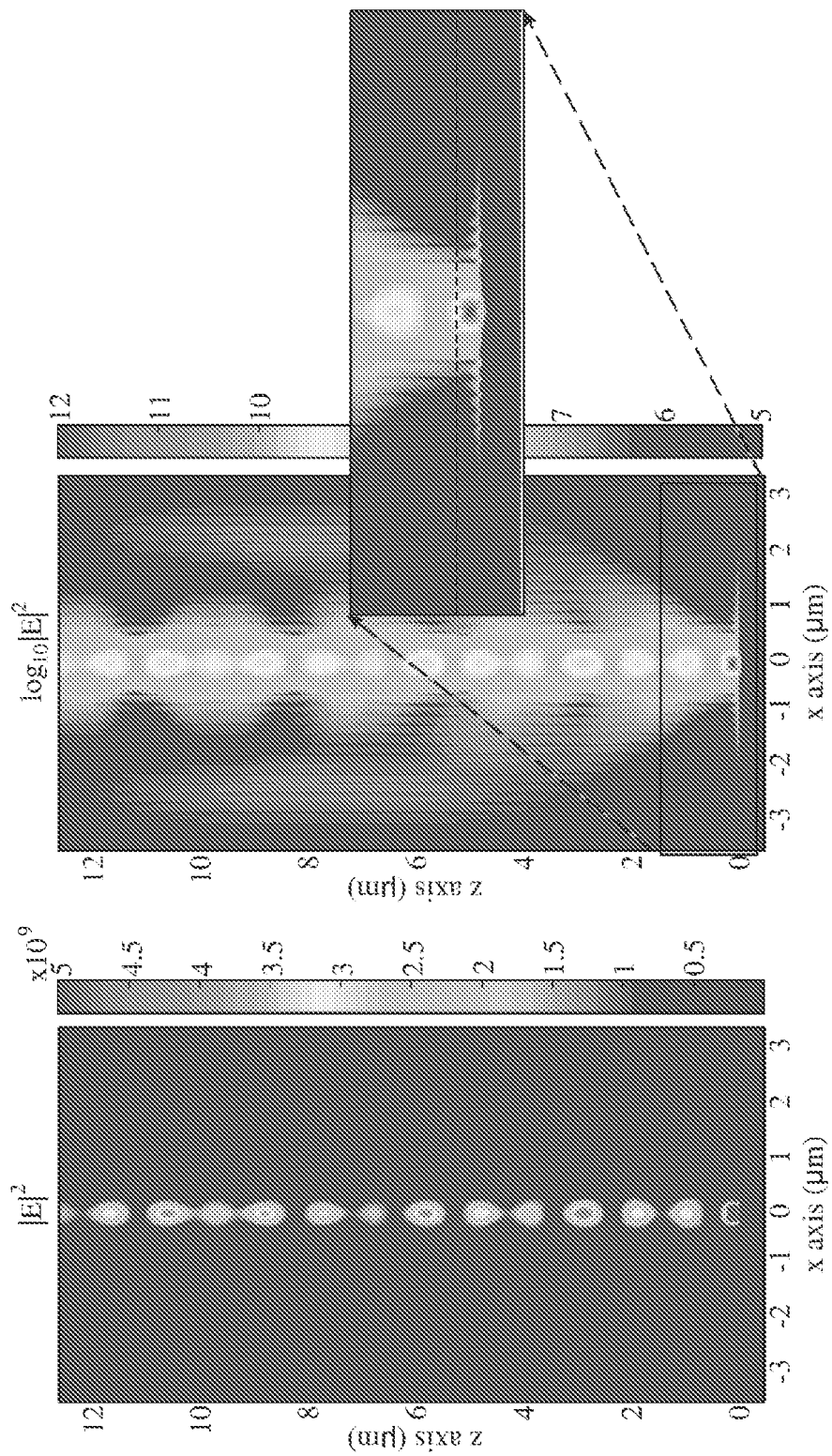

ANTENNA STRUCTURE, LIGHT EMITTING DEVICE AND METHOD FOR DESIGNING AN ANTENNA STRUCTURE

CROSS REFERENCE TO RELATED APPLICATIONS

This application is a continuation application of international patent application PCT/EP2020/071526, filed Jul. 30, 2020 and designating the United States, which is hereby incorporated by reference in its entirety.

TECHNICAL FIELD

Embodiments of the invention relate to an antenna structure, a light emitting device and a method for designing an antenna structure. The invention therefore relates to the field of antennas for directing and collecting radiation, in particular in the optical frequency range.

BACKGROUND

The usability of light emitters depends in many cases on the beam profile of the light emitted by the light emitter. In particular when the emitted light is to be coupled into a wave guide, a suitable and reliable beam profile is desired to increase the coupling efficiency for the emitted light.

Single-photon emitters are regarded as promising devices for the use in single-photon based quantum technologies. However, applicability might require bright and quasi deterministic emission of single photon into a well-defined spatial mode. Conventional attempts to direct the emission of emitted light into a suitable beam profile are mostly based on coupling the emitted light of a single-photon emitter to the fundamental mode of a nanowire or a microcavity mode. However, the fabrication of such structures requires elaborated etching techniques and, thus, results in significant manufacturing costs.

Not only single-photon emitters but also other conventional light emitters could ben-efit from a reliable and cost-efficient solution allowing the outcoupling of light in a suitable beam profile facilitating the further use of the emitted light.

The use of dielectric gratings for collecting emitted light from quantum emitters is described for example in the manuscript "Chirped circular dielectric gratings for near-unity collection efficiency from quantum emitters in bulk diamond" by Zheng et al. published in Optics Express, Vol. 25, Issue 26, pp. 32420-32435 (2017).

Moreover, in prior art antenna structures are known, which are based on creating resonant modes in a horizontal plane of the antenna structure for light in a particular spectral range by Bragg grating structures. The resonant modes aim for increasing the density of photon states at the location of the quantum emitter and thus for increasing the coupling efficiency of an emitter to these modes. Light in these resonant modes is scattered out to the vertical direction by the Bragg grating structures. The scattering happens at the periodic grating structures. A prominent feature of the prior art is to have a large Purcell factor (much larger than 1) due to the formation of the resonant modes. Such a conventional antenna structure is for instance described in the following publication:

DAVANCO ET AL: "A circular dielectric grating for vertical extraction of single quantum dot emission," ARXIV.org, CORNELL UNIVERSITY LIBRARY, 201 OLIN LIBRARY CORNELL UNIVERSITY ITHACA, NY 14853, 2 Apr. 2011 (2011-04-02)

SUMMARY

An objective technical problem therefore relates to providing devices for directing light emitted by a light emitter into a beam profile and allowing the efficient use of the emitted light.

The objective technical problem is solved by embodiments of the invention having the features of the respective independent claims. Optional embodiments are specified in the dependent claims and in the following description.

In an embodiment, the present invention relates to an antenna structure for directing light. The antenna structure comprises a reflector having a reflective surface and a ring-shaped dielectric grating arranged at the reflective surface and extending concentrically along a center axis perpendicular to the reflective surface and forming an omnidirectional reflector surrounding a low-index center portion of the ring-shaped dielectric grating. The antenna structure is configured to outcouple light emitted inside the low-index center portion through an upper end of the dielectric grating along the center axis with a Gaussian beam profile projection efficiency of at least 65%.

In another embodiment, the present invention relates to a light emitting device comprising an antenna structure according to any one of the preceding claims and one or more light emitters arranged in the low-index center portion of the antenna structure, wherein the light emitted inside the low-index center portion is emitted by the one or more light emitters.

In yet another embodiment the invention relates to a method for designing an antenna structure for a light emitter having a predetermined emission wavelength. The method comprises determining a thickness of first layers and a thickness of second layers of a ring-shaped dielectric grating to extend concentrically along a center axis perpendicular to the reflective surface and to form an omnidirectional reflector surrounding a low-index center portion, wherein the thickness of the first layers and the thickness of the second layers are determined such that their optical thickness corresponds to a quarter wavelength of the predetermined emission wavelength. The method further comprises optimizing the thicknesses of the first and second layers, a height of the dielectric grating, a position for the light emitter in a low-index center portion of the ring-shaped dielectric grating along the center axis and a diameter of the low-index center portion using a numerical optimization such as to maximize the Gaussian beam profile projection efficiency of the outcoupled emission light emitted by the emitter.

In contrast to the prior art, the claimed subject-matter is not based on creating resonant modes in the horizontal plane of the antenna structure for light and does not produce a large Purcell factor. An antenna structure according to the claimed subject-matter exhibits a Purcell factor of 1 or close to 1, i.e., in a range from 0.5 to 1.5. The antenna structure according to the claimed subject-matter forbids light propagation with a small angle with respect to the horizontal plane of the antenna structure. The omnidirectional reflector allows the emitted light to only couple to the vertical guided modes supported by the central core. Therefore emitted light that propagates to the far field is directly from the core region. This is in stark contrast to the situation of the prior art where the emitted light is from the scattering at the periodic grating structures. The omnidirectional reflector may have a central core part of the structure having a low refractive index in contrast to the conventional antenna structures. The omnidirectional reflector may possess a photonic bandgap that enables the formation of vertically propagating defect modes in the low-index center region, which may be a hollow core region. dipolar emitter arranged in the center region may efficiently couple to these vertically propagating modes, which consequently may form a high-efficiency outcoupling (over 95%) with a fundamental Gaussian mode profile in the far field.

These embodiments provide the advantage that light emitted in the low-index center portion is efficiently collected and directed along the center axis of the antenna structure and outcoupled with a suitable beam profile allowing effective use of the outcoupled light in further applications. In particular, the large overlap with a Gaussian beam profile ensures that the outcoupled light can be efficiently focused and/or efficiently coupled into a further wave guide, such as a single mode fiber.

These embodiments provide the further advantage that the antenna structure can be provided with low manufacturing effort and therefore allow providing antenna structures and light emitted devices having suitable beam profile allowing a highly versatile use of the emitted light.

The ring-shape of the dielectric grating does not necessarily require the rings to be of perfectly round shape, wherein according to an optional embodiment the rings are of perfectly round shape. According to other embodiments the rings may deviate from a round shape and may be formed in another shape, such as an elliptic shape.

The low-index center portion is a portion of the antenna structure located in the center of the ring structure and having a lower refractive index than the rings of the ring-shaped dielectric grating. According to an embodiment, the low-index center portion may be void or filled with gases, such as air or nitrogen. According to other embodiments, the low-index center portion may be filled with a liquid and/or solid material having a lower refractive index than the rings of the ring-shaped dielectric grating.

The one or more light emitters arranged in the low-index center portion of the antenna structure may be arranged in a void portion of the low-index center portion and/or may be embedded in a material having a lower refractive index than the rings of the dielectric grating. According to other embodiments, the one or more light emitters may fill a part of or the entire low-index center portion and embody the low-refractive-index material representing the low-index center portion.

The light emitted by the light emitters and/or directed by the antenna structure corresponds to optical radiation. Optionally, the light has a wavelength or frequency spectrum in the ultraviolet, visible and/or infrared spectral range. Optionally the light may have a central wavelength in the range of 100 nm to 3 μm.

Using a numerical optimization for maximizing the beam profile projection efficiency may include carrying out a simulation of the antenna structure or the light emitting device and examining the distribution of electrical field intensity of the light emitted inside the antenna structure, in particular inside the low-index center portion. The numerical optimization may be directed towards a simulation of the outcoupled light depending on various parameters of the antenna structure, such as its spatial dimensions and/or material properties, or the location of the one or more light emitters inside the low-index center portion, and an optimization to achieve an optimum of these parameters with respect to the beam profile projection efficiency of the outcoupled emission light.

According to an embodiment, the Gaussian beam profile projection efficiency $\eta$ represents a measure for the overlap of the emitted beam profile with a Gaussian beam profile. In other words, the Gaussian beam profile projection efficiency $\eta$ of the outcoupled emission light represents a parameter defining an overlap of the beam profile of the outcoupled emission light with a Gaussian beam profile. The larger the overlap of the beam profile with a Gaussian beam profile, the larger the beam profile projection efficiency $\eta$. Therefore, a large beam profile projection efficiency $\eta$ indicates a large overlap of the emission light with a Gaussian beam. A small beam profile projection efficiency $\eta$ may indicate a small overlap of the emission light with a Gaussian beam profile. According to an embodiment the possible values of the beam profile projection efficiency $\eta$ may be in a range between 0 and 1 or between 0 and 100%. A Gaussian beam profile represents the transverse mode $TEM_{00}$. Here, the Gaussian beam profile projection efficiency $\eta$ is defined as the square of the normalized overlap integral of the output field profile of the antenna and $TEM_{00}$ mode profile with a suitable beam waist. The suitable beam waist is found to maximize the projection efficiency by scanning the beam waist of the $TEM_{00}$ mode. In other words, the determination of the Gaussian beam profile projection efficiency may include or consist of determining an overlap of the actual beam profile with a Gaussian beam profile having a beam waist corresponding to a starting value and varying the beam waist until the maximum overlap of the actual beam profile with the Gaussian beam profile is achieved. This beam waist of the Gaussian beam profile is then defined as the suitable beam waist and will be used for determining the Gaussian beam profile projection efficiency. The variation of the beam waist of the Gaussian beam profile for finding the maximum overlap may be in the range of 0.1-2.0 wavelengths.

According to an embodiment, the antenna structure is configured such that the Gaussian beam profile projection efficiency $\eta$ is at least 70%, optionally at least 75%, optionally at least 80%, and optionally at least 90%. The value of the profile projection efficiency may be adapted to the intended further use of the outcoupled emission light. In principle, high Gaussian beam profile projection efficiencies may be preferred, however, some further applications of the outcoupled light may be satisfied with a Gaussian beam profile projection efficiency of 65% or may even require a Gaussian beam profile projection efficiency of 65%. A Gaussian beam profile projection efficiency of 65% may facilitate the manufacturing process and allow larger manufacturing tolerances as compared to the manufacturing process of antenna structures having a higher Gaussian beam profile projection efficiency.

According to an embodiment, the low-index center portion has an extension D in at least one direction perpendicular to the center axis. The low-index center portion may have a round cross-sectional shape in a plane perpendicular to the center axis and a diameter corresponding to the extension D. According to other embodiments, the low-index center portion may have a polygonal cross-sectional shape, such as a rectangular, hexagonal or octag-onal cross-sectional shape, wherein the extension D represents the distance of two opposite edges of the polygonal cross section.

Optionally, the extension D is not more than 1 mm, optionally not more than 100 μm, optionally not more than 10 μm, and optionally not more than 1 μm. These small extensions allow a high degree of confinement of one or more light emitters in the low-index center portion and/or reduce the manufacturing effort for the antenna structure, which often increases with increasing dimensions. The extension D and the extension of the low-index center portion, respectively, may be adapted to the spatial dimensions of an emitter(s) intended to be arranged in the low-index center portion or the space required by said emitter(s). For small light emitters, such as fluorescent or phosphorescent molecules, quantum dots or nanoparticles, a small extension D may be suitable.

According to an embodiment, the extension D is at least 100 nm, optionally at least 200 nm. This provide sufficient space of arranging one or more emitters inside the low-index center portion.

According to an embodiment, the ring-shaped dielectric grating has a height along the center axis of not more than D, optionally of not more than D/2. In other words, the height of the ring-shaped dielectric grating may depend on the spatial dimensions of the low-index center portion in a plane parallel to the reflective surface of the reflector, wherein optionally the height is not larger than the extension D and optionally not larger than half of the extension D. This allows outcoupling the emission light with a high Gaussian beam profile projection efficiency. Numerical simulations of antenna structures and light emitters according to optional embodiments having a height of not more than the extension D of the low-index center portion have shown that antenna structures with a Gaussian beam profile projection efficiency η of at more than 85% or even more than 90% may be achieved. Therefore, choosing the height of the ring-shaped dielectric grating along the center axis to be not more than the extension D of the low-index center portion may be advantageous for achieving antenna structures having very high Gaussian beam profile projection efficiencies such as more than 85%. In addition, the height limited to the value of the extension D further limits the manufacturing effort of the dielectric grating, which often increases with larger heights.

According to an embodiment, the ring-shaped dielectric grating has a height along the center axis of not more than 10 mm, optionally not more than 5 mm, optionally not more than 1 mm, optionally not more than 100 μm, optionally not more than 10 μm, optionally not more than 1 μm, optionally not more than 0.5 μm, optionally not more than 0.7 μm, and optionally not more than 1 μm. This ensures a good outcoupling efficiency. Furthermore, a limited height of the dielectric grating is beneficial for keeping the manufacturing effort low.

According to an embodiment, the ring-shaped dielectric grating comprises an alternating arrangement of first layers having a first refractive index and second layers having a second refractive index, wherein the second refractive index is higher than the first refractive index and wherein the refractive index of the low-index center portion is lower than the first refractive index. Such a structure allows efficiently providing an omnidirectional reflector surrounding the low-index center portion. Between the first and second layers and between the second and first layers no further layers are arranged having a different refractive index than the refractive indices of the first and the second layer, respectively.

According to an embodiment, one of the second layers forms the innermost layer confining the low-index center portion. In other words, one of those layers having the higher refractive index forms the innermost layer surrounding and confining the low-index center portion. This ensures good reflectivity of the omnidirectional reflector and, thus, results in a high light collection and outcoupling efficiency of the antenna structure.

According to an embodiment, the second refractive index has a value of more than 1.75 and/or wherein the first refractive index has a value in a range from 1.1 to 1.75. These refractive indices allow providing a dielectric grating having beneficial properties as an omnidirectional reflector. The first layers may optionally consist of or comprise at least one of the following materials: $MgF_2$, $SiO_2$, PMMA, glass materials, polymer materials, and CY-TOP. The second layers optionally consist of or comprise at least one of the following materials: $TiO_2$, GaAs, Cubic Zirconia, Diamond and InGaAs, AlGaAs, InGaP, GaP, and GaN. These materials allow manufacturing the ring-shaped dielectric grating by means of epitaxial growth.

According to an embodiment, the layers may each have a thickness such that their respective optical thickness, i.e., their thickness multiplied with their refractive index, matches a quarter of the wavelength of the intended emission light. The thickness may be determined for the emission light originating from the center axis and falling in radial direction onto the innermost layer of the dielectric grating. Thus, the antenna structure may be designed for a particular wavelength of the emission light and therefore may be adapted for a particular light emitter, wherein the antenna structure may also show close to optimum performance for wavelengths deviating from the design wavelength.

The ring-shaped dielectric grating may comprise at least two layers of each type, i.e., two first layers and two second layers, optionally at least three layers of each type, optionally at least five layers of each type, optionally at least 10 layers of each type. The larger the number of layers of each type, the better the omnidirectional reflectivity properties may be. However, for larger numbers of layers the manufacturing effort for the antenna structure may increase. In addition, different layer pairs may have different optical thicknesses and, thus, may be optimized to different wavelengths. By this, the antenna structure may be adapted to various different wavelengths or may be even configured as a broadband reflective device.

According to an embodiment, the low-index center portion is empty or at least partly filled with a filling material having a lower refractive index than the first refractive index, wherein the low-index center portion is at least partly filled with air or nitrogen. These materials may have a refractive index, which is lower than the refractive index of those materials, which may be chosen as materials for the first and second layers of the ring-shaped dielectric gratings. Optionally, the low-index center portion has a refractive index in the range from 1 to 1.3. This provides a particularly high difference between the refractive index of the low-index center portion and the refractive index of the second layer surrounding the low-index center portion. The higher the difference between these refractive indices, the better the omnidirectional reflective properties of the ring-shaped dielectric gratings may be.

According to an embodiment, the low-index center portion is configured to establish a distribution of the electric field intensity resembling a standing wave along the center axis from light emitted inside the low-index center portion, wherein the standing wave exhibits at least two maxima of the electric field intensity along the center axis. Such a distribution of the electric filed intensity inside the low-index center portion may be retrieved from numerical simulations of the antenna structure or the ring-shaped dielectric grating or the light emitting device. In this respect, the distribution of the electric field intensity inside the low-index center portion may be subject to a numerical optimization, wherein for instance the spatial dimensions of the dielectric grating, such as the in-plane dimensions, the height, the thicknesses and refractive indices of the layers and the spatial dimensions and refractive index of the low-index center portion may be numerically optimized to achieve a desired distribution of the electric field intensity distribution of emission light within the low-index center portion.

According to an embodiment, the ring-shaped dielectric grating has a height, such that the upper end of the dielectric grating is positioned in the rising or falling slope of one of the maxima of the distribution of the electric field intensity in a range, in which the electric field intensity has a value between 0.3 and 0.8 of the maximum field intensity. In other words, the distribution of the electric field intensity of the emission light within the low-index center portion along the center axis according to a standing wave, wherein several maxima of the electric field intensity distribution may be arranged periodically or aperiodi-cally along the center axis, may be exploited for choosing the height of the dielectric grating to obtain an outcoupling of the emission light with a Gaussian beam profile projection efficiency η of at least 65%. Optionally, the exact height for truncating the dielectric grating may be again numerically optimized. However, numerical simulations have shown that at least for some embodiments a truncation height overlapping with a slope of the electric field intensity distribution in a range, in which the electric filed intensity has a value between 0.3 and 0.8 of the maximum field intensity will result in a Gaussian beam profile projection efficiency η of at least 65%.

According to an embodiment, the antenna structure is configured to receive one or more light emitters in the low-index center portion. The emitters may comprise or consist of single-photon emitters, quantum emitters, fluorescent and/or phosphorescent emitters.

According to an embodiment, the antenna structure further comprises a top layer element arranged at the upper end of the ring-shaped dielectric grating. Such a top layer element may serve the purpose of further influencing the outcoupling efficiency and/or the outcoupling beam profile of the emission light. Alternatively or in addition, such a top layer element may serve the purpose of ingress protection to avoid fluid or solid contaminations entering the antenna structure and/or to avoid the contents of the low-index center portions, such as one or more light emitters, being exposed to the surrounding atmosphere for pre-venting undesired oxidation or degradation of the contents. According to another embodiment, the top layer element has a half-sphere shape and optionally is configured as a solid immersion lens.

Further optional embodiments will be illustrated in the following with reference to the drawings.

BRIEF DESCRIPTION OF THE DRAWINGS

FIGS. 7A to 7E illustrate an optimization of the truncation height of the ring-shaped dielectric grating with respect to the Gaussian beam profile projection efficiency of the out-coupled light.

Figure 1A:
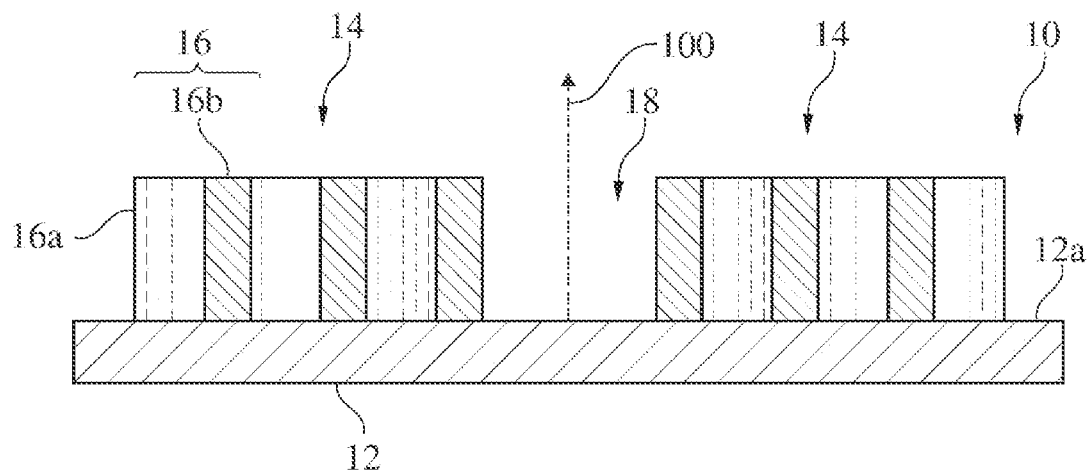
FIGS. 1A to 1E show antenna structures according to various optional embodiments of the invention.

In the drawings the same reference signs are used for corresponding or similar features in different drawings.

DESCRIPTION OF EXEMPLARY EMBODIMENTS

FIGS. 1A to 1E depict various of antenna structures 10 according to different optional embodiments of the invention. The antenna structures 10 comprise a reflector 12 having a reflective surface 12a on the upper side of the reflector 12. In addition, the antenna structures 10 comprise a ring-shaped dielectric grating 14 arranged at the reflective surface 12a of the reflector 12 and extending concentrically along a center axis 100 and forming an omnidirectional reflector for light emitted in the center of the ring-shaped dielectric grating. The ring-shaped dielectric grating 14 comprises several layer pairs 16, each consisting of a first layer 16a and a second layer 16b. The embodiments shown in FIGS. 1A to 1E each comprise a ring-shaped dielectric grating formed of three layer pairs 16, wherein in other embodiments may have less or more layer pairs. The first layers are made of a material having a first refractive index and the second layers are made of a material having a second refractive index, which is higher than the first refractive index.

A low-index center portion 18 is arranged in the center of the ring-shaped dielectric grating 14, the refractive index of which is smaller than the first and second refractive index of the first and second layers 16a, 16b, respectively. Said low-index center portion 18 is surrounded in radial direction around the center axis 100 by the ring-shaped dielectric grating 14 such that the dielectric grating 14 forms an omnidirectional reflector at least for such optical radiation, which is emitted by a light emitter (not shown) placed inside the low-index center portion 18 on the center axis 100 and which is emitted perpendicular to the center axis 100. One of the second layers 16b having the higher second refractive index (as compared to the lower first refractive index of the first layers 16a) forms the innermost layer 16b representing the boundary between of the ring-shaped dielectric grating 14 and the low-index center portion 18. The first layers 16a may have a refractive index of 1.38. The second layers 16b may have a refractive index of 2.58.

According to the embodiment shown in FIG. 1A the low-index center portion 18 is void. Depending on the surrounding of the antenna structure 10, the low-index center portion may be evacuated or filled with a fluid, such as gases like air, nitrogen and/or inert gases. The refractive index of the low-index center portion 18, thus, may essentially correspond to the refractive index or vacuum, air or the respective gas. Therefore, the refractive index of the low-index center portion 18 may be in the range of 1.0 to 1.1 and consequently well below the first and second refractive index of the first and second layers 16a, 16b, respectively.

The height of the ring-shaped dielectric grating 14 may be for instance in a range between 200 nm and 1 μm, although other heights may be possible according to other embodiments.

Figure 1B:
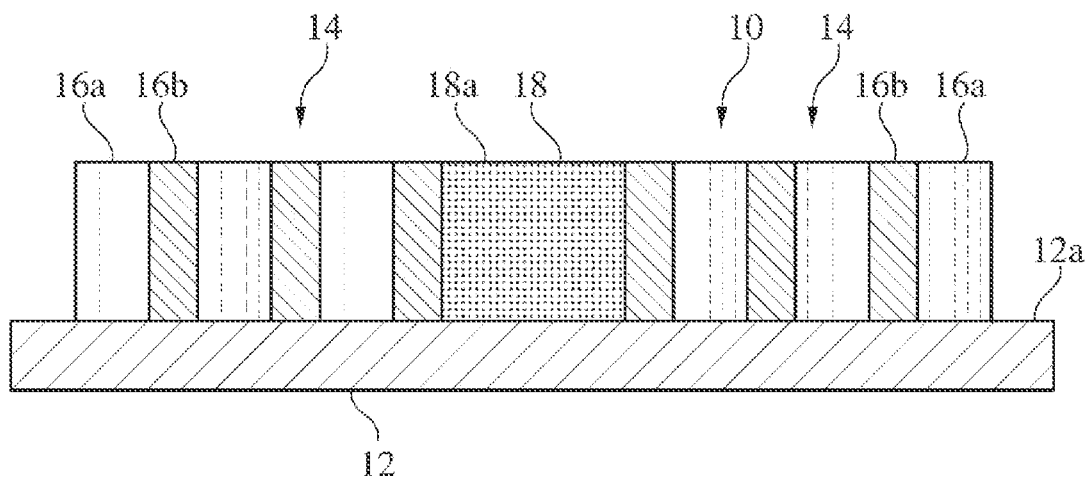

The embodiment shown in FIG. 1B corresponds to the embodiment of FIG. 1A in most aspects but differs from the embodiment of FIG. 1A in its low-index center portion 18. According to this embodiment the low-index center portion 18 is entirely filled with a low-refractive index material. The low-index center portion 18 may be filled with fused silica having a refractive index lower than the first and second refractive index of the first and second layers 16a, 16b, respectively. For instance, the refractive index of the low-index center portion 18 may be 1.3 for the target wavelength, for which the antenna structure is designed. The height of the low-index center portion 18 according to this embodiment corresponds to the height of the surrounding ring-shaped dielectric grating 14. However, according to other embodiments, the height of the low-index center portion 18 may be higher or smaller than the height of the surrounding ring-shaped dielectric grating 14. The low-index center portion 18 being filled with a solid material, as shown in this embodiment, may allow incorporating one or more light emitters, such as quantum emitters, single photon emitters, nanoparticles and/or fluorescent or phosphorescent molecules. In this case, it may be advantageous to select an emitter being capable of emitting light inside the surrounding material of the low-index center portion 18.

Figure 1C:
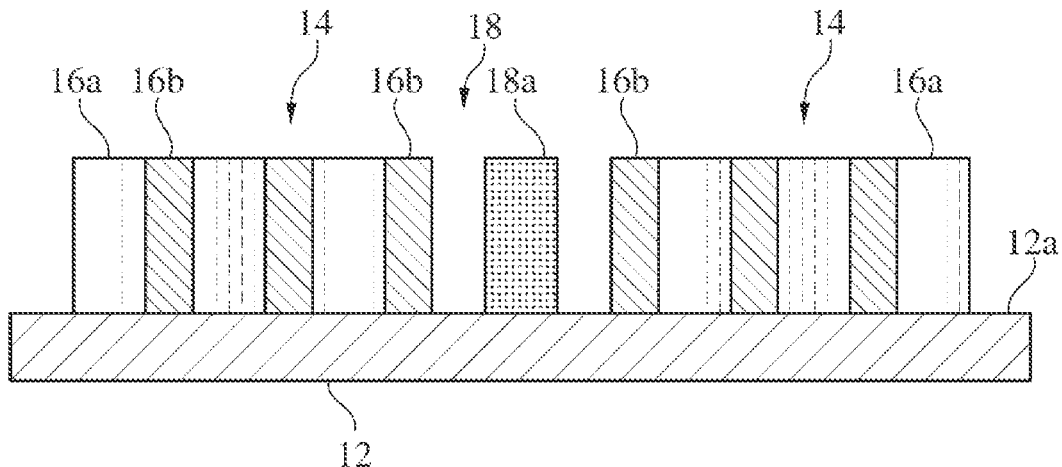

FIG. 1C shows an embodiment similar to the embodiment of FIG. 1B, wherein the difference lies in the different configuration of the low-index center portion 18. According to the embodiment of FIG. 1C the low-index center portion 18 comprises a solid material component 18a, which, however, does not fill the entire low-index center portion 18 in radial direction. In other words, according to this embodiment, the low-index center portion 18 comprises a solid material component 18a centered along the center axis 100 and a surrounding gap layer, which may be void, evacuated or filled with air or a surrounding fluid. One or more light emitters may be arranged in the solid material component 18a and/or in the surrounding gap. Optionally, the solid material component 18a and also the gap in the low-index center portion 18 each have a lower refractive index than the second layer 16b of the ring-shaped dielectric grating 14.

Figure 1D:
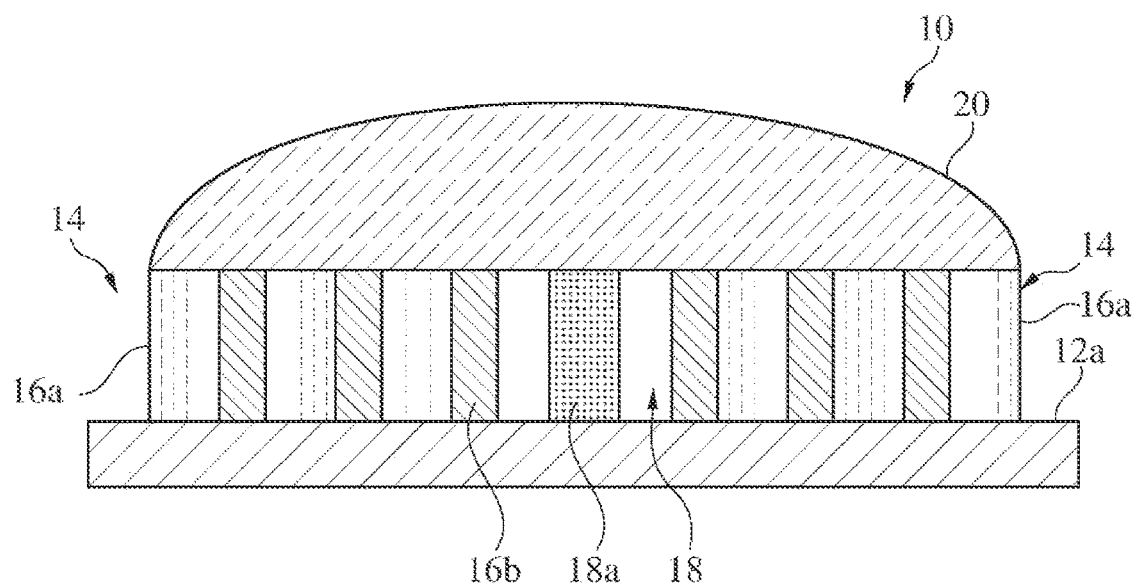
Figure 1E:
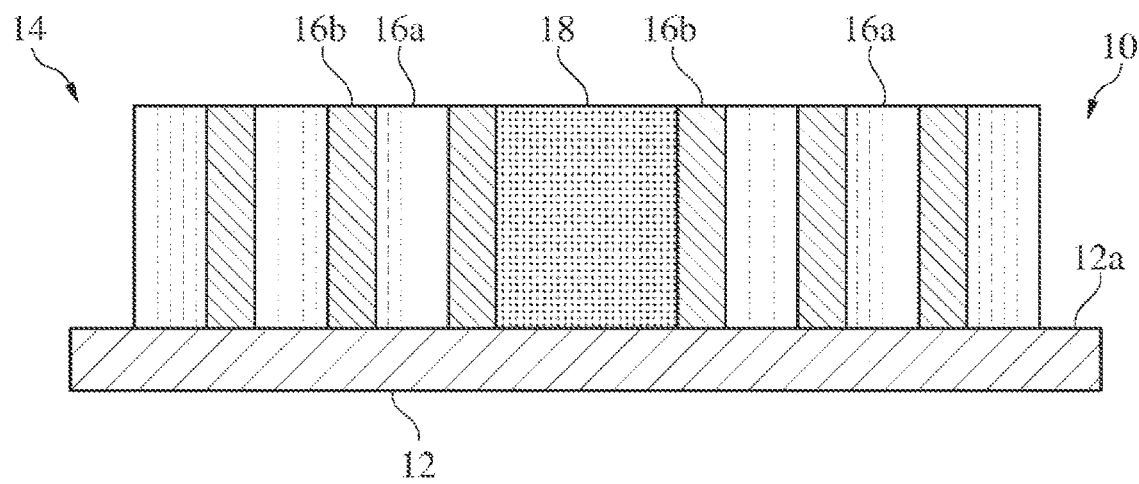

FIG. 1D illustrates yet another embodiment of the antenna structure 10, which corresponds to the embodiment of FIG. 1C but additionally comprises a top layer element 20. The top layer element 20 is an optical element arranged on top of the ring-shaped dielectric grating 14 and covering the dielectric grating 14 and the low index center portion 18. According to the depicted embodiment, the top layer element 20 may be in direct contact with the upper end of the dielectric grating 14 and/or the low-index center portion 18. However, according to other embodiments one or more optical layers may be arranged between the upper end of the ring-shaped dielectric grating 14 and the top layer element 20. According to the embodiment presented in FIG. 1D, the top layer element has the same lateral extension, i.e., the same extension perpendicular to the center axis 100, as the ring-shaped dielectric grating. However, according to other embodiments, the lateral extension of the top layer element 20 may be smaller than the ring-shaped dielectric grating 14 and consequently no cover the whole upper side of the dielectric grating 14. According to yet other embodiments, the top layer element 20 may extend beyond the dielectric grating 14 in lateral direction and may optionally extend down to the reflector 12 such as to completely enclose the dielectric grating 14 and the low-index center portion 18. By this, the top layer element may provide advantages with regard to ingress protection to prevent foreign objects and/or fluids from entering the antenna structure 10.

The top layer element 20 may act as an optical element for influencing the light outcoupling from light emitted by a light emitter inside the low-index center portion 18. For this purpose, the top layer element 20 may have a refractive index matched to the refractive indices of the dielectric grating and/or the low-index center portion 18 to facilitate and/or enhance the outcoupling of light emitted inside the low-index center portion 18. Alternatively, or additionally, the top layer element may exhibit refractive and/or diffractive power to alter the beam shape or optical mode of the outcoupled light. This may be advantageous with regard to the intended further use of the outcoupled light.

Figure 2:
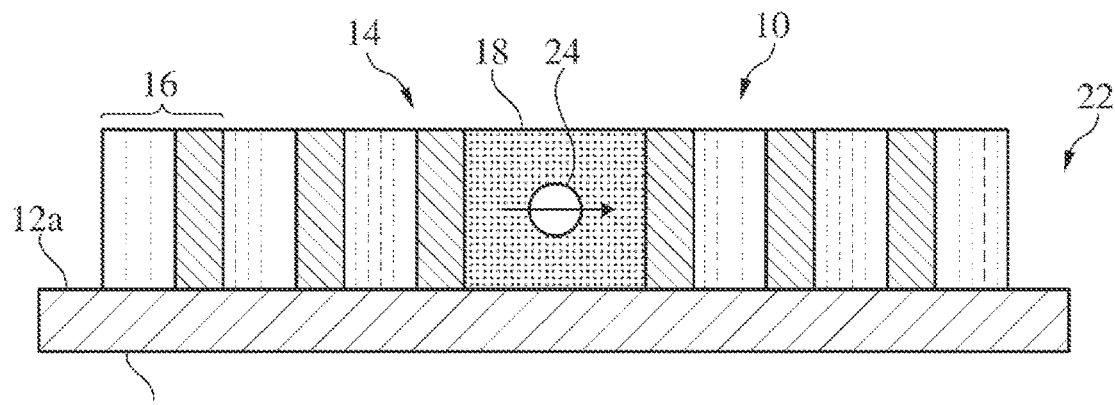
FIG. 2 shows a light emitting device according to an embodiment of the invention.

FIG. 2 depicts a light emitting device 22 comprising an antenna structure according to the embodiment shown in FIG. 1B. The light emitting device 22 further comprises a light emitter 24, which is arranged in the low-index center portion 18. According to this embodiment, the light emitter 24 is arranged centered at the center axis 100. However, according to other embodiments one or more light emitters 24 may be arranged also off-centered at a different location within the low-index center portion 18.

The light emitter 24 is indicated by a round symbol and the arrow penetrating the round symbol indicates the direction of the dipole moment, which is oriented perpendicular to the center axis and parallel to the reflective surface 12a of the reflector. Light emitted by the light emitter 24 inside the low-index center portion 18 at least partly perpendicular to the center axis 100 is reflected by the ring-shaped dielectric grating 14 acting as an omnidirectional reflector. Light reflected downwards in the direction towards the reflecting surface 12a is reflected by the reflective surface 12a in upward direction. Therefore, the light emitting device 22 is designed to outcouple light emitted within the low-index center portion 18 solely through the upper surface or end of the low-index center portion 18. The dimensions of the low-index center portion 18 and the height of the antenna structure 10 along the center axis 100, the light emitting device may be optimized with respect to the emission properties, such as to obtain a Gaussian beam profile projection efficiency η of 65% or more for outcoupled light.

With reference to the following drawings, several exemplary embodiments of the invention will be discussed in detail, although the scope of the invention is not limited to these specific exemplary embodiments.

Figure 3A:
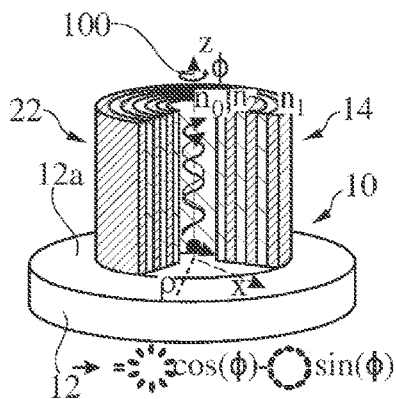
FIGS. 3A to 3C illustrate a light emitting device according to an embodiment of the invention.

FIG. 3A shows in a schematic diagram a light emitting device 22 comprising an antenna structure 10 and a light emitter 24 inside the low-index center portion 18 arranged along the center axis 100. The antenna structure 10 comprises a ring-shaped dielectric grating 14 extending in a cylindric shape along the center axis 100 acting as an omnidirectional reflector, wherein the low-index center portion 18 is void (besides the light emitter 24) according to this embodiment. The center axis 100 corresponds to the symmetry axis of the ring-shaped dielectric grating 14. A quarter of the ring-shaped dielectric grating 14 is cut out for illustrative purposes solely. The bottom of the antenna structure 10 is a reflector 12, which is embodied as a silver mirror, with a reflective surface 12a on the upper side, wherein the ring-shaped dielectric grating 14 is attached to the reflective surface 12a.

The light emitted by the light emitter 24 couples to the defect-guide modes. The illustrations at the bottom shows that a vector x along the symmetry axis can be expressed as a linear combination of the radial coordinate p and the angular coordinate (I). The cut-open ring-shaped dielectric grating 18 shows the layered structure of the dielectric grating having a plurality of first layers having a first refractive index and a plurality of second layers having a second refractive index, as discussed above with reference to FIGS. 1A to 1E.

Figure 3B:
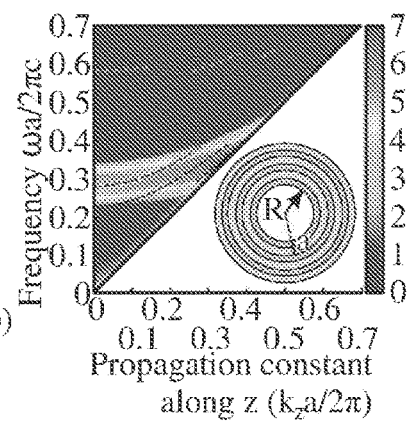

FIG. 3B shows a visualization of the dispersion relation of a simulated, infinitely long (along the center axis 100)

hollow-core coaxial waveguide with radius R=3a (a=$t_1+t_2$, $t_1$=130 nm, $t_2$=55 nm), a first refractive index of the first layers 16a of $n_1$=1.38 and a second refractive index of the second layers 16b of $n_2$=2.58. The low-index center portion 18 has a refractive index $n_0$=1.0. The dark regions in the lower and upper part of the dispersion relation plot indicate extended modes that propagate in the entire bilayer structure. The dashed lines (black dashed lines) in the central bright area of the plot indicate the defect guide modes in the first bandgap, wherein the dashed lines (white dashed lines) in the upper part of the plot indicate the defect guide mores in the second bandgap.

Figure 3C:
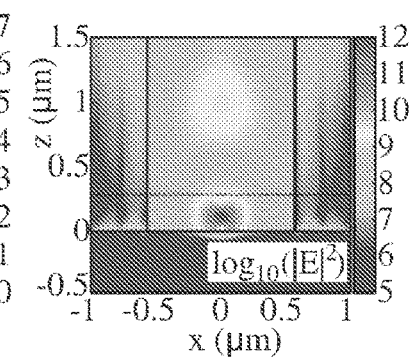

FIG. 3C shows a plot of the calculated electric field intensity distribution in the x-z plane, i.e., a plane including the center axis 100), of the simulated device, as described with reference to FIG. 3B. The calculation of the electric field intensity distribution was carried out using a body of revolution finite-difference time domain (BOR-FDTD) method with an azimuthal number m=1. An in-plane dipole is positioned in the semi-infinite coaxial waveguide at a distance of 120 nm from the reflecting surface of the silver mirror. The black dashed line indicates a possible height where the structure could be truncated to obtain a high Gaussian beam profile projection efficiency of 65% or well beyond.

The low-index center portion according to this embodiment has a radius of R and a low index of refraction denoted as no (ideally $n_0$=1) and the dielectric bilayers 16 have thicknesses of $t_1$ of the first layers 16a and $t_2$ of the second layers 16b and refractive of indices of $n_1$ and $n_2$, respectively. The circular periodic enclosing of the emitter by the ring-shaped dielectric grating 14 and the low-index center portion 18 force its emission into de-fect-guided modes. The stack of circular dielectric bilayers with a finite height h is placed on a flat silver mirror as a reflector 12. Photons can thus leave the antenna structure 10 only on one side, which is the upper side in the light emitting device depicted in FIG. 3A. The truncation of the antenna structure 10 at an appropriate height h enables efficient conversion of the defect-guided modes into the fundamental Gaussian mode in the upper homogeneous medium with a refractive index of $n_3$. We note that the working principle as described above completely differs from circular gratings which have been used previously for efficient photon collection. For example, this device does not rely on Purcell enhancement of the sponta-neous emission rate.

For an analysis, let us assume the height of the ring-shaped dielectric grating to be infinite along the center axis 100. This scenario is the same to a dipole radiating inside an all dielectric coaxial waveguide. Omnidirectional reflection is obtained if light in the low-index center portion with a refractive index no cannot access the Brewster angle of the bilayer, which is $$\theta_b=\tan^{-1}(n2/n1),$$

which requires that $n_0<n_1n_2/\sqrt{n_1^2+n_2^2}$, wherein $n_2>n_1$. If the above condition is not satisfied, there will at least one p-polarized plane wave exist that refracts at the $n_0/n_2$ interface and is then transmitted through the whole ($n_2/n_1$) bilayer stack, which is not omnidirectional reflection any more. If a single emitter is embedded in a medium with a high refractive index (such as epitaxially grown quantum dots), one has to partially remove the medium around the emitter in order to effectively create a low index no center portion. In order to inhibit the coupling of emission into modes with a large in-plane wavenumber, we design the bilayer such that the Bragg reflection condition is met for the modes with small longitudinal wavevectors $k_z$ (i.e., large in-plane wavenumbers). Each layer should become a quarter-wave layer. As a result the target wavelength will be in the bandgap, i.e.

$$t_1\sqrt{n_1^2-(k_z/k_0)^2}=\lambda_0/4,$$

$$t_2\sqrt{n_2^2-(k_z/k_0)^2}=\lambda_0/4,$$

where $\lambda_0$ is the target wavelength of light in vacuum for which the antenna structure has been designed for, and $k_0$ is the vacuum wavenumber. $t_i$ and $n_i$(i=1,2) are associated with the thickness and refractive index of material i of the bilayer. If the emitter's with dipole moment is oriented in the plane, we find that $k_z$=0,5$k_0$ is a good choice. The central core radius R is an important parameter which determines the number of defect waveguide modes that are supported by the structure. For sufficiently small R it is possible to have a single-mode hollow omniguide. However, if one chooses a mode field diameter which too small it can result in a too strongly diverging beam at the position where it exists the structure. For that reason, we consider for the following analysis a core size of R~3($t_1+t_2$) which supports two to three defect-guided modes in the interesting wavelength range. If the grating structure is designed to have a correct height, these modes then evolve into the fundamental Gaussian mode with a low divergence.

In the next step we want to investigate the mode properties of the dielectric coaxial waveguide. To do so we apply a transfer matrix method in order to solve the dispersion equation. We exemplarily study here a stack of 10 bilayers with a thickness of $t_1$=130 nm and $t_2$=55 nm for a target wavelength of $\lambda_0$=640 nm. The refractive indices are set to $n_0$=1.0, $n_1$=1.38 (e.g., MgF$_2$) and $n_2$=2.58 (e.g., TiO$_2$). The innermost ring must be made out of the material with a larger refractive index ($n_2$ in our case). In FIG. 3B we show a color-mapped two-dimensional graph for a determinant. It is derived from a dispersion relation equation, which determines the relation between the normalized frequency and the propagation constant in z direction. The graph uses a logarithmic scale. It is important to note that a small magnitude indicates the existence of an optical mode in the structure. Here we plot only the upper left side of the light line (thick black line). In this region modes can propagate without attenuation along the z direction. On the other hand there is a continuous dark region where modes can exist in the entire bilayer stack. The black-dashed (white-dashed) lines inside the bright (dark) background region are the defect waveguide modes in the first (second) photonic bandgap of the bilayer stack. Single emitters in the core region could couple to these defect-guided modes.

The infinitely long coaxial waveguide is only a starting point for the design and optimization of the realistic antenna structure, where the dielectric grating has only a sub-wavelength height and a reflector consisting of a metallic mirror underneath. To quantitatively simulate a dipole radiating in such an antenna, one has to rely on three-dimensional (3D) electromagnetic numerical calculations, which are computationally intensive since the com-putation volume is rather large. The demand further increases when one has to optimize several geometric parameters. For demonstrating the working principle and the optimization procedure, we investigate here a dipole located on the central axis of the rotationally symmetric structure. Later we drop this restriction. A linearly-polarized in-plane dipole, which we assume to be oriented along the x direction, can be considered as a linear combination of dipoles along the unit vectors $\hat{p}$ and $\hat{\phi}$ of a polar coordinate system (see FIG. 3A):

$$p_0\vec{x}=p_0\cos(\phi)\hat{p}-p_0\sin(\phi)\hat{\phi},$$

where $p_0$ is the magnitude of the electric dipole moment. With the excitation source chosen by us and the given rotationally symmetric structure, the electromagnetic fields ($E_\rho$, $E_z$, $E_\phi$, $H_\rho$, $H_z$, $H_\phi$) have a dependence on $\phi$ in the form of $\psi_c(\rho, z) \cos(\phi) + \psi_s(\rho, z) \sin(\phi)$. This enables us to use a BOR-FDTD method with azimuthal number m=1. This effectively reduces the computational demand of a 3D problem to that of a 2D case without losing accuracy and consequently enables us to perform rigorous numerical simulations and allows us to efficiently optimize the structural parameters. The validity of the method has been benchmarked with a commercially available 3D FDTD solver (LUMERICAL FDTD SOLUTIONS). The BOR-FDTD method with m=1 has been used to compute the fields due to an in-plane dipole radiating inside a semi-infinite all-dielectric coaxial waveguide structure placed on a silver mirror. The parameters of the all-dielectric waveguide structure are set to be the same as in FIG. 3B. FIG. 3C displays the absolute value of the total electric field amplitude distribution near the low-index center portion for an in-plane dipole source which is placed at a distance of 120 nm from the mirror. It is clear that the radiation of the dipole is well confined in the core region and the field distribution evolves periodically along the z direction. The field distribution obtained at the black-dashed line (z=h) resembles a Gaussian profile. The position z=h is therefore a suitable height for the antenna structure in order to obtain a Gaussian-mode emission into free space. As a result, the outcoupled light will have a larger Gaussian beam profile projection efficiency.

In order to quantify the efficiency of the antenna structure for directing single photons, we introduce the collection efficiency $\gamma$ defined as the ratio of the far-field emission to the total emission from the emitter, and the Gaussian beam profile projection efficiency 77, which is a projection efficiency of the far field emission onto the fundamental Gaussian mode. The total efficiency of the emission into the fundamental Gaussian mode is then given by $\gamma\eta$. To calculate $\eta$, we expand the numerically computed electric field $\vec{E}(\rho, \phi, z)$ in the top-most medium $n_3$ into Laguerre-Gaussian modes which form a complete orthogonal basis. The normalized coefficient for the fundamental Gaussian mode reads $$c_1 = \frac{\int\int_\Omega ds [\vec{E}(\rho, \phi, z) * \vec{E}_g^*(\rho, \phi, z-z_0, \omega_0)]}{\sqrt{\int\int_\Omega ds |\vec{E}(\rho, \phi, z)|^2} \sqrt{\int\int_\Omega ds |\vec{E}_g(\rho, \phi, z-z_0, \omega_0)|^2}},$$

where $\vec{E}_g(\rho, \phi, z-z_0, w_0)$ is the field distribution function of the fundamental Gaussian mode and ($\rho$, $\phi$, z) are cylindrical coordinates, $\omega_0$ is radius of the beam waist and $z_0$ is its in the cylindrical coordinate system. The integration is computed for the whole plane at a fixed z. We found that the coefficient $c_1$ does not depend on z but depends on $\omega_0$ and $z_0$. We can scan $\omega_0$ and $z_0$ for the integration, and obtain a maximum value of $|c_1|$ for the best set of the Laguerre-Gaussian modes. Note that the Gaussian beam projection efficiency $\eta$ is simply given by $|c_1|^2$. With the BOR-FDTD method (m=1) and the above evaluation criteria, we can explore numerous designs and optimize the important parameters of the truncated omnidirectional reflector. We will give now several exemplary designs to illustrate the performance and generality of the devices according to exemplary embodiments. Our design procedure can be described as a two-step process:

1) Determine the thickness of the two bilayer materials by satisfying the quarter-wave condition. This initial bilayer thickness is only an initial guess for the parameters. The metal mirror and the top-most homogenous medium will modify the dispersion relation.

2) Optimize the thickness of each bilayer material, truncation height h, the dipole position d within the low-index center portion and R of the low-index center portion via BOR-FDTD calculations. The goal is here to reach the highest total projection efficiency and total efficiency $\gamma\eta$ of the outcoupled photons/light.

Figure 4A:
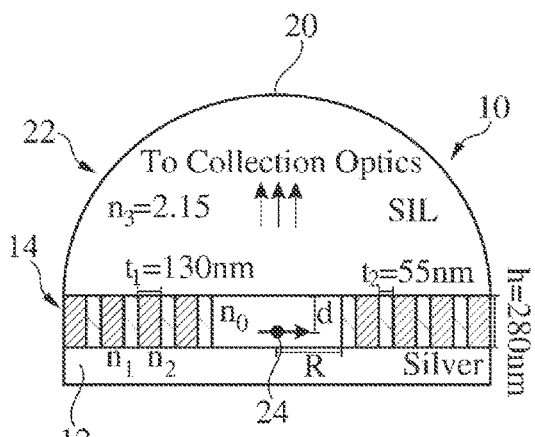
FIGS. 4A to 4D illustrate a light emitting device according to another embodiment of the invention.

FIGS. 4A to 4D show a light emitting device according to an embodiment for directing single photons and related simulation data. FIG. 4A represents a sketch of the device.

Figure 4B:
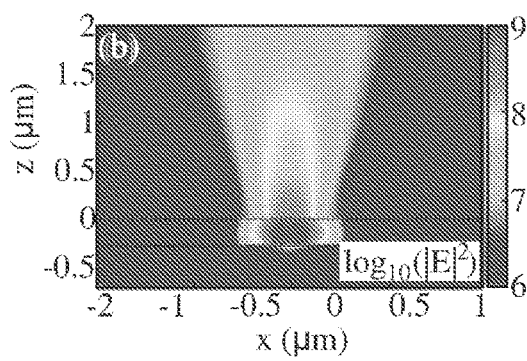
Figure 4C:
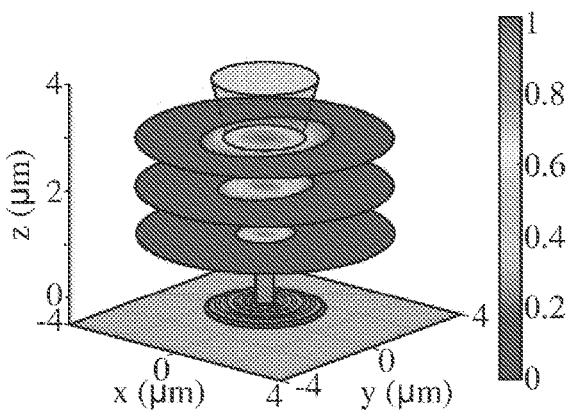
Figure 4D:
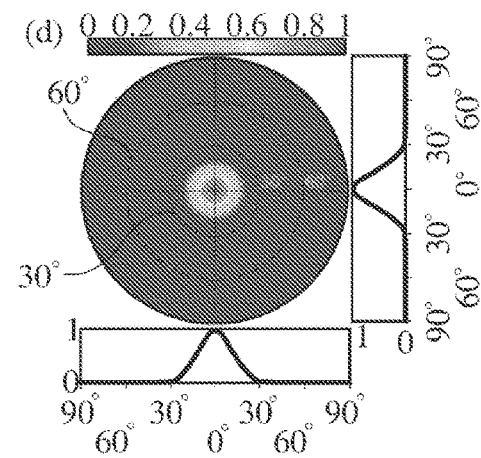

The top layer element 20 has a refractive index of $n_3=2.15$. The optimized device geometric parameters are h=280 nm, d=160 nm and R=570 nm, respectively. The other parameters are the same as for the embodiment of FIG. 3B. FIG. 4B shows the electric field intensity distribution in a logarithmic scale for an in-plane dipole radiating on the symmetry axis of the antenna structure 10. FIG. 4C depicts the intensity distribution in linear scale in horizontal planes at three different heights of the antenna structure along the center axis 100. The fields resemble the free propagation of a fundamental Gaussian mode (as indicated by the red beam). FIG. 4D shows the far-field emission pattern of the light emitter 24 as a function of in-plane wavenumbers.

In this exemplary embodiment of a light emitting device 22, we place an in-plane dipole light emitter without any surrounding medium inside the void low-index center portion 18 (schematically shown in FIG. 4A). The same parameters of the all dielectric coaxial waveguide structure as in FIG. 3B are used. The structure is truncated at a height h and the top-most layer element has a refractive index of $n_3=2.15$ (e.g., ZrO2). The top-most layer element may have the form of a half sphere, which may function as a so-called solid immersion lens (SIL). Different from a planar interface, an SIL structure avoids refraction and thus lowers the divergence angle of light leaving the device. The vertical position of the dipole light emitter with respect to the SIL's flat surface is denoted as d. The Gaussian beam profile projection efficiency is optimized for h=280 nm and d=160 nm. FIG. 4B shows the electric field intensity distribution in a logarithmic scale in the vertical plane for a dipole emitter radiating inside the structure, i.e., inside the low-index center portion 18. One clearly observes that although there is some field penetrating vertically into the metal substrate of the reflective surface 12a and transversely into the ring-shaped dielectric grating 14, the vast majority of the light field is confined in the core region and propagates upwards for collection. FIG. 4C displays the intensity distribution in horizontal planes at three different heights in medium $n_3$. It resembles again the free propagation of a Gaussian beam. We have used here the Lorentz reciprocity theorem to calculate the far-field emission pattern of the emitter in this planar multilayer system from the electric and magnetic fields in the near field (calculated via BOR-FDTD), as described in Yang et al., ACS Photonics 2016, 3, 395-402. The angular emission pattern shows a well-confined single central lobe as plotted in FIG. 4D. It resembles clearly a Gaussian distribution in k—space. The divergence angle $\theta$ is 23.6°. Our calculations show $\gamma=97.9\%$ and $\eta=97.3\%$, which leads to a total efficiency of 95.1% into the fundamental Gaussian mode.

Figure 5A:
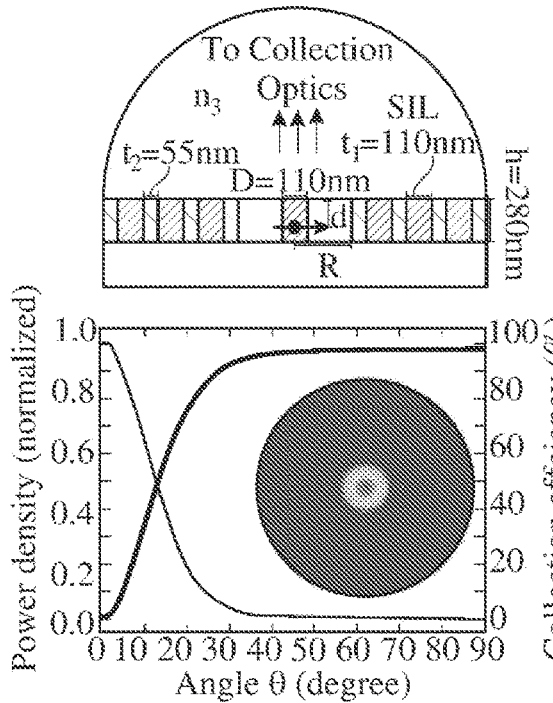
FIGS. 5A to 5D illustrate various light emitting devices according to further embodiments of the invention.
Figure 5B:
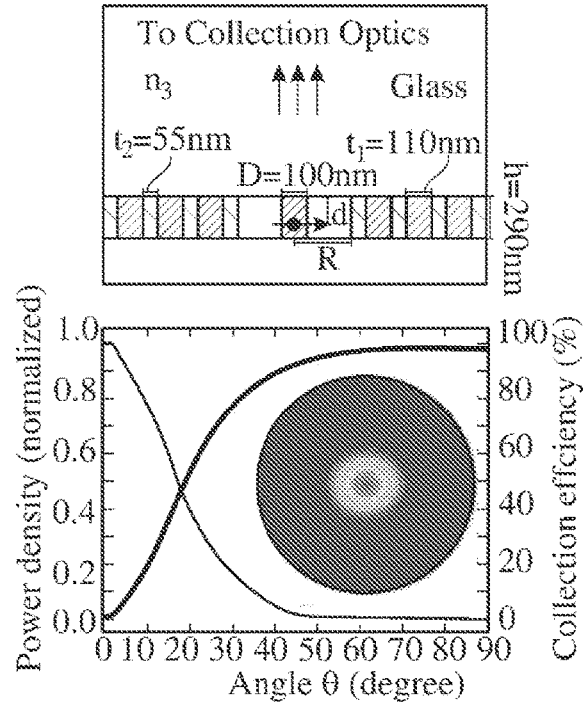
Figure 5C:
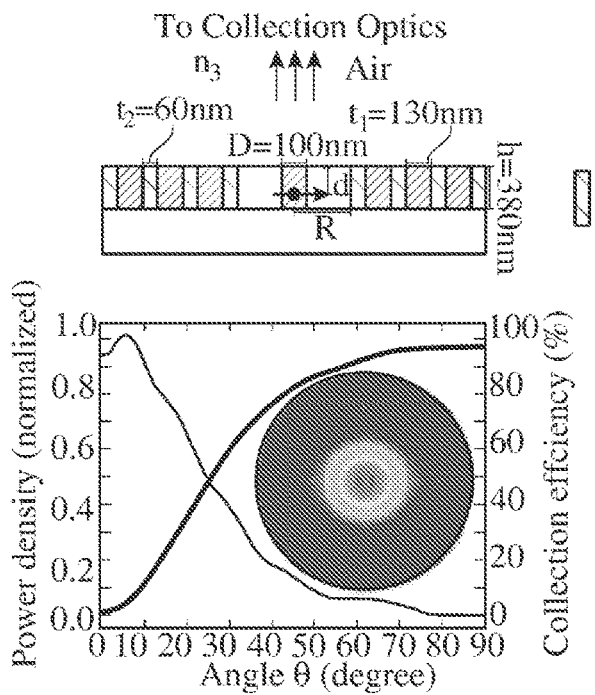
Figure 5D:
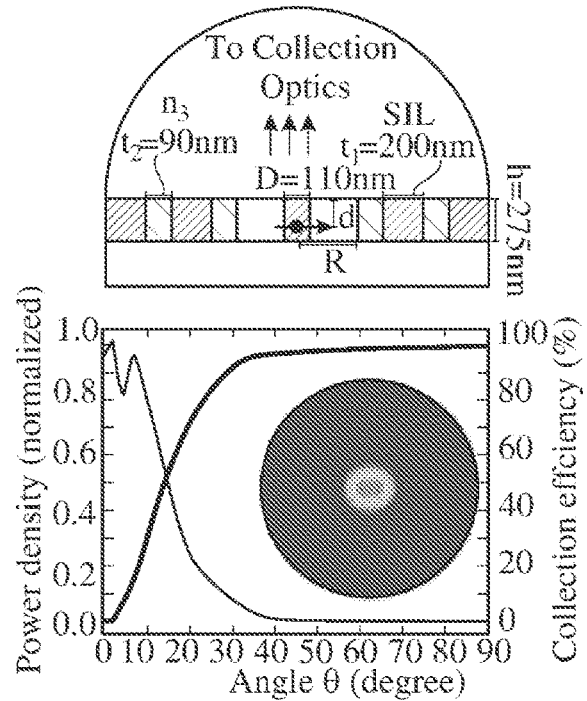

FIGS. 5A to 5D illustrate other embodiments of light emitters 22. The upper part of each figure shows the sketch of the device structure while the lower part shows the angular emission density and collection efficiency. In the inset we plot the 2D angular emission pattern. As presented in FIGS. 5A to 5D, the second type of design of the device considers a case when the emitter is embedded in a solid hosting medium with a refractive index $n_e$=1.5 as indicated in the upper part of FIG. 5A. To fulfill the condition $n_0 < n_1 n_2 / \sqrt{n_1^2 + n_2^2}$, we remove part of the hosting medium around the emitter to effectively reduce the refractive index $n_e$. As shown in the device sketch, in the center there is only a nanodisk with a diameter of 100 nm left and thickness equal to the grating structure height. Here we kept the refractive index $n_3$=2.15 and modified the refractive index $n_1$, which is now 1.5. Possible material choices of $n_1$ include silicon oxide or a polymer like polymethyl methacrylate (PMMA) or Polyvinyl alcohol (PVA). In all cases, $n_2$=2.58 and $n_1$=$n_e$=1.5 with $n_e$ being the index of the 100 nm-diameter nanodisk at the device center, which functions as the hosting material for embedding the emitter. This leads to a change in the thickness of the bilayers ($t_1$=110 nm, $t_2$=50 nm) and the optimized parameters are found to be h=280 nm. The optimized values of the bilayer thicknesses and height are shown in the sketch above each graph. The device shown in FIG. 5A has a top layer element having a refractive index of $n_3$=2.15. Optimal structural parameters may be d=145 nm, and R=590 nm. Performance of the device is given by $\gamma$=98.1% and $\eta$=96.9%. The inset shows the angular emission pattern with a single central lobe having a divergence angle of 24.5°. The high refractive index SIL keeps the divergence angle low. This structure is therefore for example compatible with a cryogenic environment where high numerical aperture objectives are not easily available. The device shown in FIG. 5B has a top layer element having a refractive index of $n_3$=1.5. Optimal structural parameters may be d=180 nm, and R=600 nm. The inset and lower panel of FIG. 5B shows that the emission remains basically Gaussian. However, the divergence angle is now as large as 37.3°. The performance parameters of the device are $\gamma$=97.8% and $\eta$=90.3%. This antenna structure is designed to be combined with an oil immersion objective. Finally, the device shown in FIG. 5C has a top layer element having a refractive index of $n_3$=1.0. Optimal structure parameters are d=140 nm and R=550 nm. Performance of the device is given by $\gamma$=96.2% and $\eta$=90.7%. The emission profile is distorted and the divergence angle is now 50°. However, a microscope objective with a numerical aperture of 0,95 can still capture the emitted photons. The examples discussed so far rely on the coupling to the defect modes in the first photonic bandgap. They provide good performance but require small feature sizes. One can also consider defect modes in the second bandgap (shown by the white-dashed lines in the upper left corner of FIG. 3B). The device in FIG. 5D is adapted to use the second photonic bandgap. It has a top layer element with $n_3$=2.15. The optimized structural parameters may be, $t_1$=200 nm, $t_2$=90 nm, d=265 nm and R=500 nm. Performance of the device is given by $\gamma$=97.9% and $\eta$=96.2% with a divergence angle as small as 26.4°. FIG. 5D displays the emission pattern and angle-dependent collection efficiency are displayed. In this design the pitch sizes have doubled making actual nanofabrication of the device easier.

Figure 6A:
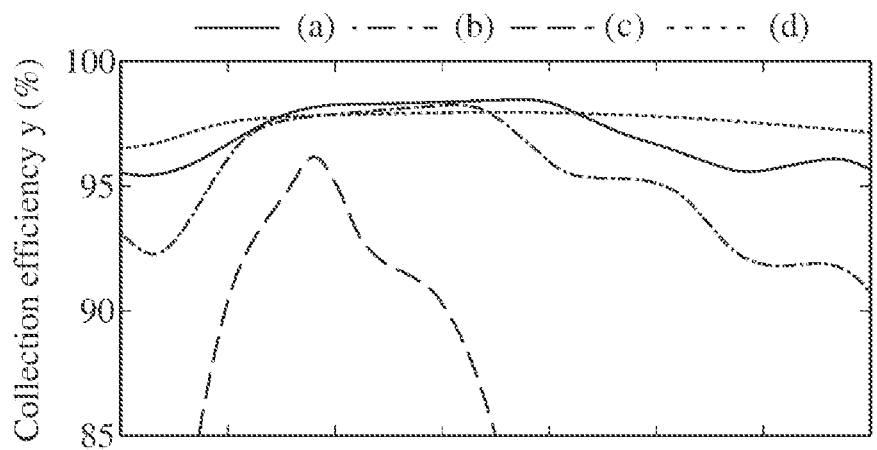
FIGS. 6A to 6C illustrate spectral characteristics of a light emitting device according to an embodiment of the invention.
Figure 6B:
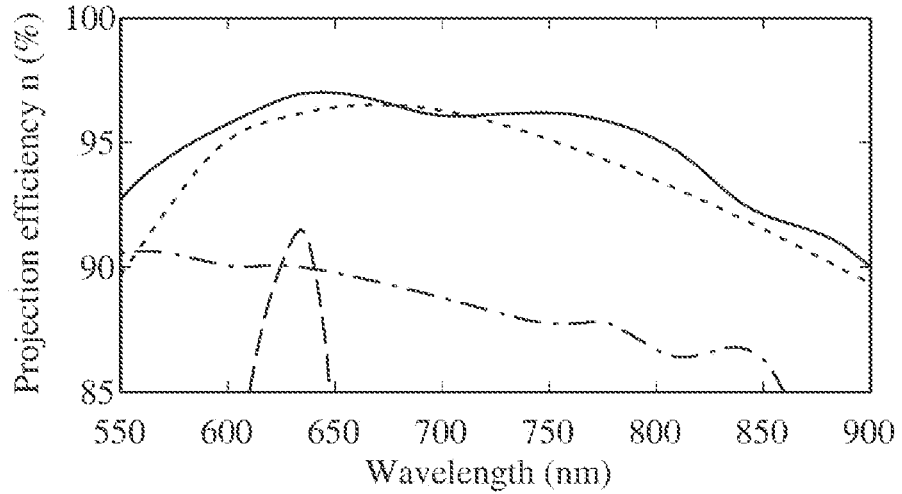
Figure 6C:
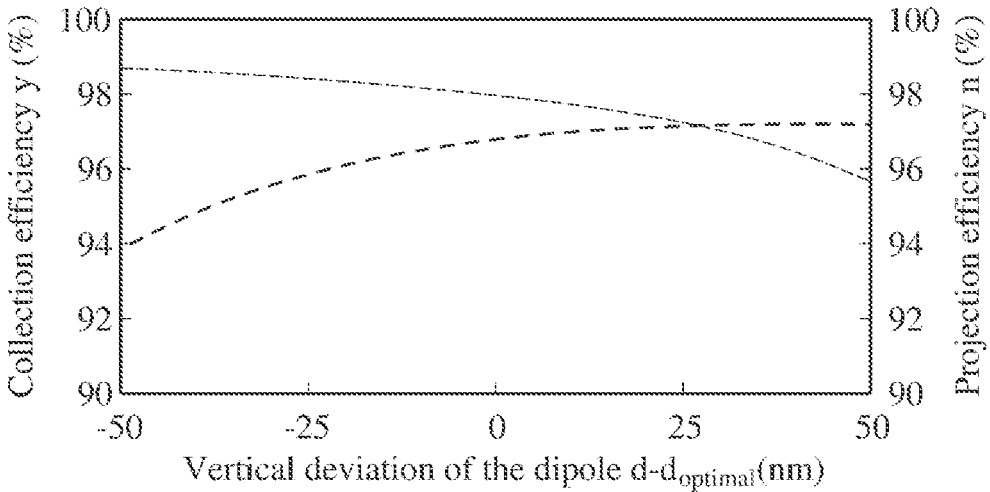

All four designs shown in FIGS. 5A to 5D rely on inhibiting the in-plane emission and enhancing guided-defect mode emission. A Purcell effect is not required. Our simulated Purcell factors are all close to one. Next, we explore the spectral properties and the tolerance to the emitter's position. FIGS. 6A and 6B show the spectral responses of the collection efficiencies and the projection efficiencies for the structures studied in FIG. 5A to FIG. 5D. Here the numbering a to d relates to the devices shown in FIG. 5A to 5D. We obtain in each case more than 97% collection efficiency over a pretty broad spectral range except for the case with $n_3$=1.0. This spectral bandwidth is larger than 200 nm for the two cases with $n_3$=2.15 and still about 150 nm for the case with $n_3$=1.5. For the example where $n_3$=1.0, a collection efficiency over 90% is obtainable over 100 nm. All the structures exhibit large projection efficiencies (see FIG. 6B). A higher refractive index of the top medium leads to both a larger collection efficiency and projection efficiency. We have also studied the dependence of the emission on the longitudinal positions of the emitter for the device shown in FIG. 5A. FIG. 6C shows $\gamma$ and $\eta$ as a function of the emitter position d. If we displace the emitter by ±25 nm from the optimal dipole position we observe that the collection efficiency and projection efficiency change by less than 1%. We also performed simulations for a laterally displaced emitter. Again, deviations as large as 25 nm cause changes of less than 0.5% to the collection efficiency and projection efficiency, respectively. We have used silver as the material of the metal mirror in our simulations. We also have obtained similar perfor-mances (collection efficiency about 1~2% lower) by using a gold bottom mirror.

With reference to FIGS. 7A to 7E further illustrations of the influence of the height of the antenna structure on the Gaussian beam profile projection efficiency $\eta$ are provided.

FIG. 7A shows the calculated electric field intensity distribution in a simulated ring-shaped dielectric grating according to the antenna structure shown in and discussed with reference to FIGS. 3A to 3C. The ring-shaped dielectric grating is simulated with an infinite height in z-direction. As can be seen in FIG. 7A, the electric field intensity distribution comprises a distribution representing or being similar to a standing wave inside the low-index center portion along the central axis 100 in z-direction. The first intensity maximum is located close to the lower end of the low-index center portion. Further maxima are located with a spacing of about 1 µm along the z-direction. FIG. 7B shows the same information as FIG. 1A, wherein the intensity scale is presented in a logarithmic plot. The enlarged section of the lower part of the antenna structure depicts an enlarged view of the area around the bottom part of the antenna structure, i.e., the part of the ring-shaped dielectric grating adja-cent to the reflective surface of the reflector and the first two intensity maxima. The white dashed line indicates an optional truncation height, which would provide a high Gaussian beam profile projection efficiency of the outcoupled light when truncating the antenna structure at the indicated height.

Figure 7C:
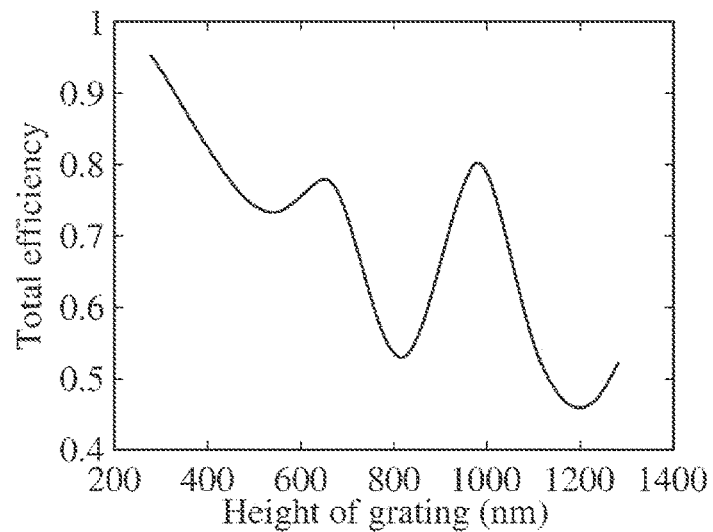
Figure 7D:
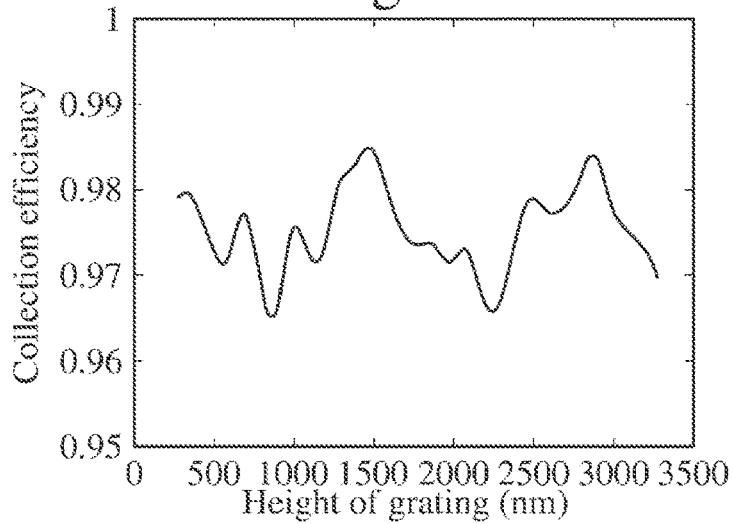
Figure 7E:
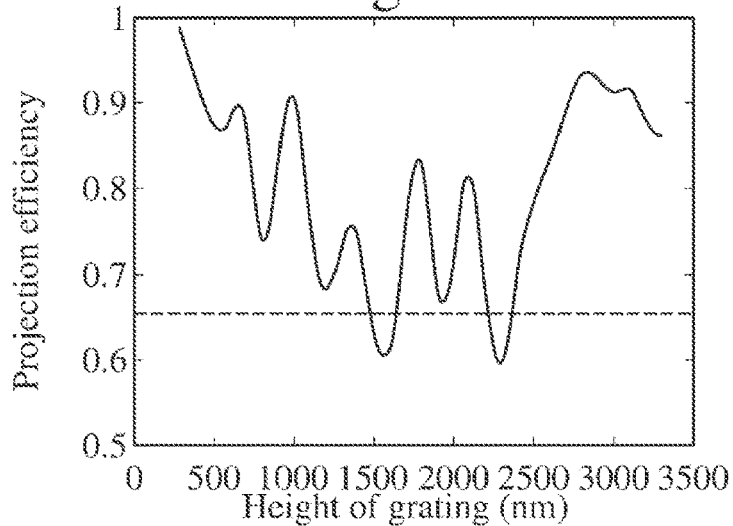

FIGS. 7C to 7E show plots of the total efficiency $\gamma\eta$ (FIG. 7C), the collection efficiency $\gamma$ (FIG. 7D) and the Gaussian beam profile projection efficiency $\eta$ (FIG. 7E) with respect to the truncation height of the antenna structure (the ring-shaped dielectric grating). The total efficiency is plotted for a height range of 200 nm to about 1,300 nm. The collection efficiency and the projection efficiency are plotted for a height range from about 200 nm to about 3,500 nm. The collection efficiency shows for the whole height range stable values in a range between 0.96 to 0.99. Accordingly, for the collection efficiency, which determines the outcoupling efficiency of emitted light, the height of the antenna structure appears to be of minor relevance.

However, the projection efficiency and accordingly also the total efficiency can be found to be strongly dependent on the height of the ring-shaped dielectric grating. For heights up to about 700 nm, the projection efficiency is high and decreases from a value close to 1 to about 0.9. Therefore, truncating the antenna structure at a height of not more than 700 nm might be beneficial for achieving a high beam profile projection efficiency of more than 85%. For larger heights beyond 700 nm, the projection efficiency shows a strongly fluctuating behavior with several maxima and minima. By choosing a suitable truncation height, also in this range a high projection efficiency of more than 65% or even more than 80% can be achieved, if truncating the ring-shaped antenna structure at the slopes of the maxima of the electric field intensity distribution in a range, where the electric field intensity is about 0.3 to 0.8 of the maximum intensity of the respective maximum. Hence, also for truncation heights higher than 700 nm a high projection efficiency can be achieved for the outcoupled light when considering the fluctuating distribution of the electric field intensity distribution along the center axis.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE SIGNS 10 antenna structure
12 reflector
12a reflecting surface
14 ring-shaped dielectric grating
16 (dielectric) layer pair
16a first layer
16b second layer
18 low-index center portion
18a solid material component
20 top layer element
22 light emitting device
24 light emitter
100 center axis

The invention claimed is:

1. An antenna structure for directing light, the antenna structure comprising:
a reflector having a reflective surface; and
a ring-shaped dielectric grating arranged at the reflective surface and extending concentrically along a center axis perpendicular to the reflective surface and forming an omnidirectional reflector surrounding a low-index center portion of the ring-shaped dielectric grating,
wherein the antenna structure is configured to outcouple light emitted inside the low-index center portion through an upper end of the dielectric grating along the center axis with a Gaussian beam profile projection efficiency η of at least 65%.

2. The antenna structure according to claim 1, wherein the Gaussian beam profile projection efficiency η represents a measure for an overlap of the emitted beam profile with a Gaussian beam profile.

3. The antenna structure according to claim 1, wherein the antenna structure is configured such that the Gaussian beam profile projection efficiency η is at least 70%.

4. The antenna structure according to claim 1, wherein the low-index center portion has an extension D in at least one direction perpendicular to the center axis.

5. The antenna structure according to claim 4, wherein the low-index center portion has a round cross-sectional shape in a plane perpendicular to the center axis and a diameter corresponding to the extension D.

6. The antenna structure according to claim 4, wherein the extension D is not more than 1 mm.

7. The antenna structure according to claim 4, wherein the extension D is at least 100 nm.

8. The antenna structure according to claim 4, wherein the ring-shaped dielectric grating has a height along the center axis of not more than D.

9. The antenna structure according to claim 1, wherein the ring-shaped dielectric grating has a height along the center axis of not more than 10 mm.

10. The antenna structure according to claim 1, wherein the ring-shaped dielectric grating has a height along the center axis of at least 50 nm.

11. The antenna structure according to claim 1, wherein the ring-shaped dielectric grating comprises an alternating arrangement of first layers having a first refractive index and second layers having a second refractive index, wherein the second refractive index is higher than the first refractive index and wherein the refractive index of the low-index center portion is lower than the first refractive index.

12. The antenna structure according to claim 11, wherein one of the second layers forms an innermost layer confining the low-index center portion.

13. The antenna structure according to claim 11, wherein the second refractive index has a value of more than 1.75 and/or wherein the first refractive index has a value in a range from 1.1 to 1.75.

14. The antenna structure according to claim 11, wherein the first layers consist of or comprise at least one of the following materials: $MgF_2$, $SiO_2$, PMMA, Diamond, Cubic Zirconia, GaAs, InGaP, InGaAs, and AlGaAs.

15. The antenna structure according to claim 11, wherein the second layers consist of or comprise at least one of the following materials: $TiO_2$, GaAs, Diamond, and InGaAs.

16. The antenna structure according to claim 1, wherein the low-index center portion is empty or at least partly filled with a filling material having a lower refractive index than the first refractive index, and wherein the low-index center portion is at least partly filled with air or nitrogen.

17. The antenna structure according to claim 1, wherein the low-index center portion has a refractive index in a range from 1 to 1.1.

18. The antenna structure according to claim 1, wherein the low-index center portion is configured to establish a distribution of the electric field intensity resembling a standing wave along the center axis from light emitted inside the low-index center portion, and wherein the standing wave exhibits at least two maxima of the electric field intensity along the center axis.

19. The antenna structure according to claim 17, wherein the ring-shaped dielectric grating has a height, such that the upper end of the dielectric grating is positioned in the rising or falling slope of one of the maxima of the distribution of the electric field intensity in a range, in which the electric filed intensity has a value between 0.3 and 0.8 of the maximum field intensity.

20. The antenna structure according to claim 1, wherein the antenna structure is configured to receive one or more light emitters in the low-index center portion.

21. The antenna structure according to claim 1, further comprising a top layer element arranged at the upper end of the ring-shaped dielectric grating.

22. The antenna structure according to claim 21, wherein the top layer element has a half-sphere shape.

23. A light emitting device comprising:
the antenna structure according to claim 1; and
one or more light emitters arranged in the low-index center portion of the antenna structure, wherein the light emitted inside the low-index center portion is emitted by the one or more light emitters.

24. The light emitting device according to claim 23, wherein the one or more light emitters comprise at least one single photon emitter.

25. A method for designing an antenna structure for a light emitter having a predetermined emission wavelength, the method comprising the steps:

determining a thickness of first layers and a thickness of second layers of a ring-shaped dielectric grating to extend concentrically along a center axis perpendicular to a reflective surface and to form an omnidirectional reflector surrounding a low-index center portion, wherein the thickness of the first layers and the thickness of the second layers are determined such that their optical thickness corresponds to a quarter wavelength of the predetermined emission wavelength;

optimizing the thicknesses of the first and second layers, a height of the dielectric grating, a position for the light emitter in the low-index center portion of the ring-shaped dielectric grating along the center axis and a diameter of the low-index center portion using a numerical optimization such as to maximize the Gaussian beam profile projection efficiency n of the out-coupled emission light emitted by the emitter.

* * * * *